(12) United States Patent
Kawai

(10) Patent No.: US 7,690,578 B2
(45) Date of Patent: Apr. 6, 2010

(54) WIRELESS IC TAG JOINING METHOD, WIRELESS IC TAG-CARRYING ARTICLE, AND VEHICLE

(75) Inventor: Wakahiro Kawai, Kyoto (JP)

(73) Assignee: Omron Corporation, Kyoto (JP)

( * ) Notice: Subject to any disclaimer, the term of this patent is extended or adjusted under 35 U.S.C. 154(b) by 1078 days.

(21) Appl. No.: 10/569,456

(22) PCT Filed: Aug. 25, 2004

(86) PCT No.: PCT/JP2004/012213

§ 371 (c)(1),
(2), (4) Date: Feb. 24, 2006

(87) PCT Pub. No.: WO2005/021292

PCT Pub. Date: Mar. 10, 2005

(65) Prior Publication Data

US 2006/0164250 A1    Jul. 27, 2006

(30) Foreign Application Priority Data

Aug. 29, 2003   (JP) ............................. 2003-306530
Aug. 2, 2004    (JP) ............................. 2004-225450

(51) Int. Cl.
    *G06K 19/06*    (2006.01)
(52) U.S. Cl. .................................. 235/492; 152/152.1
(58) Field of Classification Search .................. 235/492
    See application file for complete search history.

(56) References Cited

U.S. PATENT DOCUMENTS 6,087,930 A    7/2000   Kulka et al.
6,400,261 B1   6/2002   Starkey et al.
6,406,990 B1   6/2002   Kawai
2002/0093422 A1*  7/2002   Shimura ...................... 340/447

FOREIGN PATENT DOCUMENTS

| EP | 0 689 950 A2 | 1/1996 |
|---|---|---|
| JP | 7-42514 U | 8/1995 |
| JP | 7-266811 A | 10/1995 |
| JP | 9-509488 A | 9/1997 |
| JP | 11-85935 A | 3/1999 |
| JP | 11-102424 A | 4/1999 |
| JP | 2000-084681 A | 3/2000 |
| JP | 2001-156110 | 6/2001 |
| JP | 2001-156110 A | 7/2001 |
| JP | 2001-525283 A | 12/2001 |
| JP | 2002-214060 A | 7/2002 |
| JP | 2002-324281 A | 11/2002 |
| JP | 2003-302290 A | 10/2003 |
| JP | 2004-13449 A | 1/2004 |
| JP | 2004-90775 A | 3/2004 |
| WO | WO 99/29524 A1 | 6/1999 |
| WO | WO 2004/022362 A1 | 3/2004 |

\* cited by examiner

*Primary Examiner*—Daniel Walsh
*Assistant Examiner*—Tae Kim
(74) *Attorney, Agent, or Firm*—Dickstein Shapiro LLP

(57) ABSTRACT

A flat IC tag contains memory means capable of data storage and transmission means capable of data transmission. The IC tag has on a surface thereof an unvulcanized rubber having identical properties to the unvulcanized rubber used for an article to which the IC tag is mounted. The opposite surface of the IC tag is mounted to the article before vulcanization. The article is vulcanized in this state to mount the IC tag to the article. Hence, the IC tag is not damaged if attached to tires and other articles in harsh operating environment.

14 Claims, 11 Drawing Sheets

F I G. 4 (A)
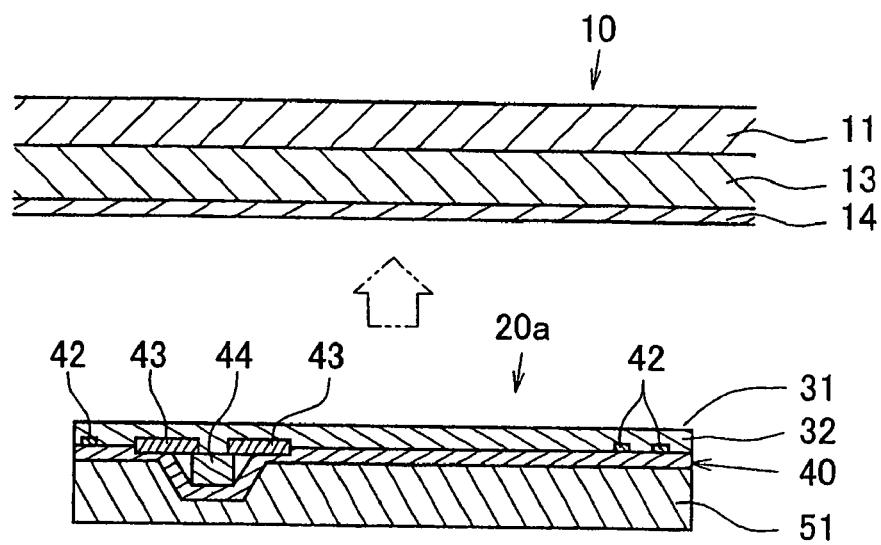
F I G. 4 (B)
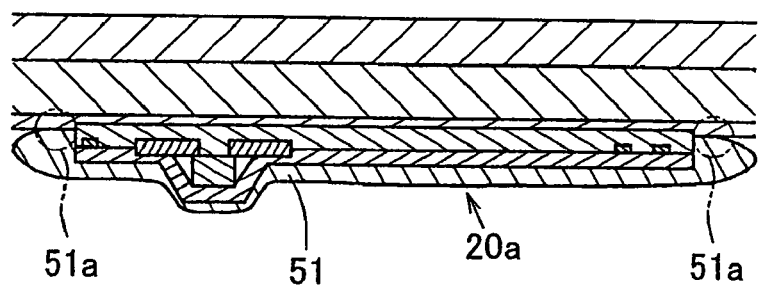

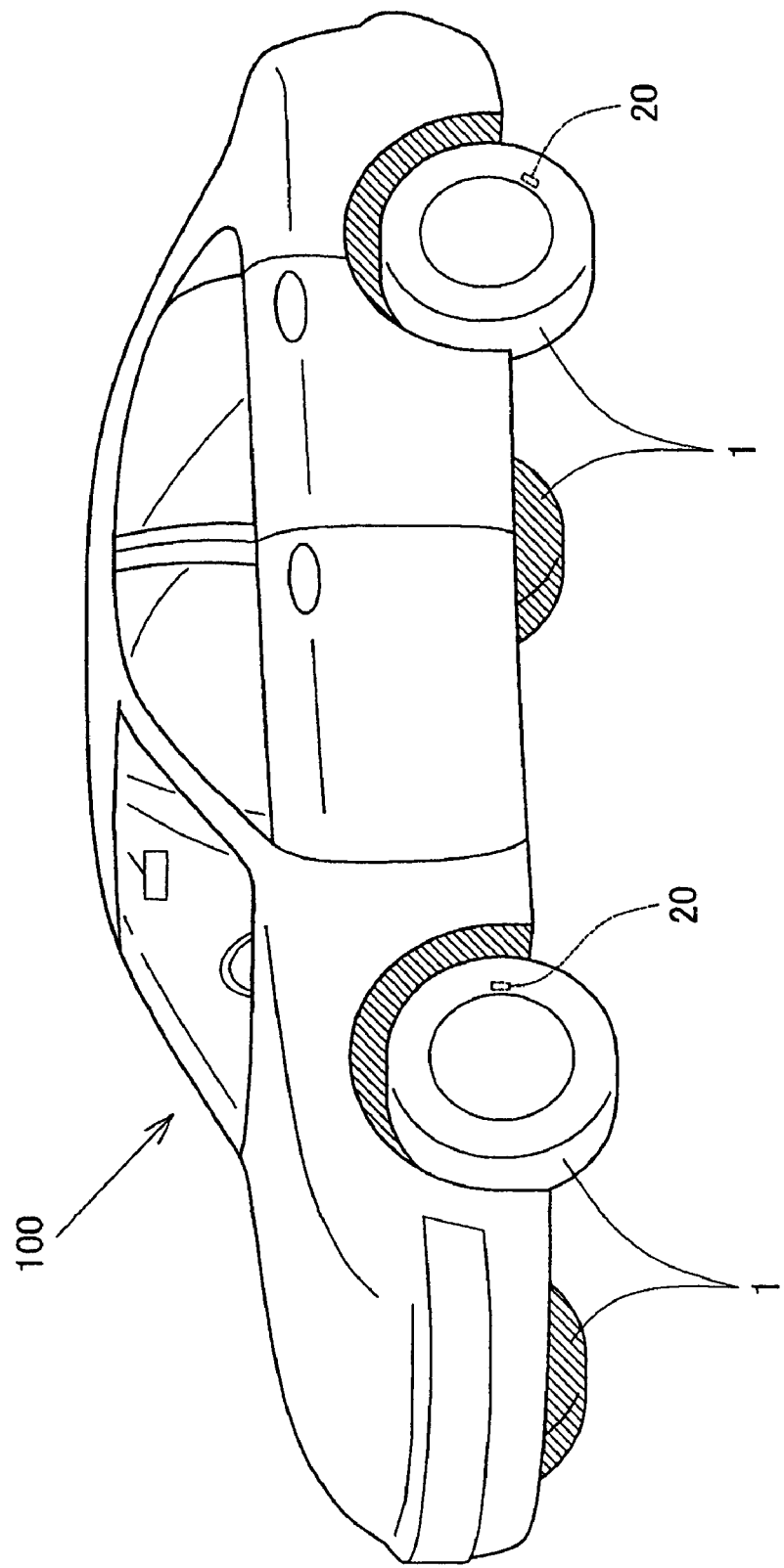

F I G. 1 1 (A)
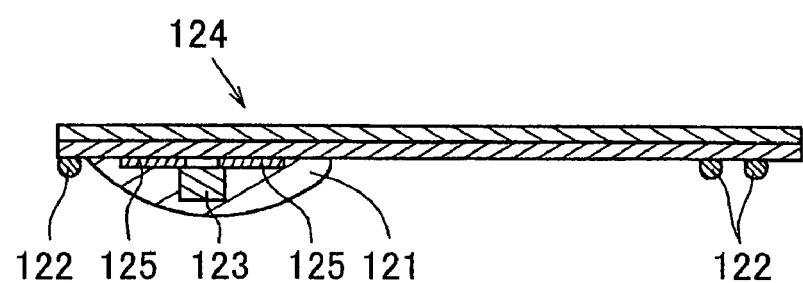
F I G. 1 1 (B)
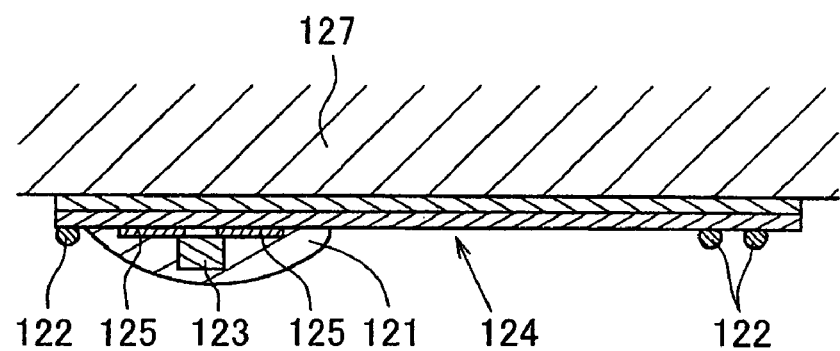

WIRELESS IC TAG JOINING METHOD, WIRELESS IC TAG-CARRYING ARTICLE, AND VEHICLE

TECHNICAL FIELD

The present invention relates to wireless IC tag securing methods for mounting to articles wireless IC tags which can be read by means of, for example, induced electromagnetic field without direct contact. The invention also relates to wireless IC tag carrying articles and vehicles.

BACKGROUND ART

In the management of manufacture, delivery, distribution, maintenance, etc. of tires for automobiles and other vehicles, one needs to know quickly the unique information of individual tires: e.g., model number, serial number, specifications, properties, process history, and usage history.

Especially, the Product Liability law (PL law) provides that if a product inflicts any harm or damage on a person's life, body, or property due to a defect of the product, the manufacturer is responsible for compensating for the damage caused whether or not the incident is accidental. The provision makes it essential for the manufacturer to manage individual tires.

In addition, the American Department of Transport, or DOT, stipulates that the serial numbers of an individual tire and the vehicle identification number (VIN) must be included in the warrant of the tire so that identification and storage is possible.

Conventional methods for marking the tire with the unique information are disclosed in Japanese Unexamined Patent Publications 7-266811/1995 (Tokukaihei 7-266811; published Oct. 17, 1995) and 2000-084681 (Tokukai 2000-084681; published Mar. 28, 2000), among others. The former describes a method of attaching a bar code sticker to the surface or inside a tire. The latter describes a method of engraving the tire surface with an ID code.

However, these two bar code and engraving methods have the amount of information limited by display area. In addition, the bar code and engraving may fade and become unrecognizable due to peeling, abrasion, or like causes. The bar code, in particular, can be smeared and illegible after use in severe environment. This problem is partly addressed by attaching the bar code sticker inside the tire; the information on the bar code sticker cannot be utilized after the tire is mounted to a vehicle.

Other methods propose mounting a non-contact data communications device.

An example is found in Japanese Unexamined Patent Publication 11-102424/1999 (Tokukaihei 11-102424; published Apr. 13, 1999). There is provided a buffer layer composed of a resin film containing gel resin. The layer covers a portion including the joint of a circuit board and an antenna coil. All these parts are in turn enclosed in packaging material. This is intended to prevent external mechanical shock and the stress developed by deformation of an article itself from damaging internal components.

Another example is found in Published Japanese Translation of PCT Application 2001-525283 (Tokuhyo 2001-525283; published Dec. 11, 2001). An elastomeric material is provided to a circular part of a pneumatic tire. A device capable of data processing and transmission, enclosed in the elastomeric material, is mounted to the tire.

A further example is found in Japanese Unexamined Patent Publication 2002-214060 (Tokukai 2002-214060; published Jul. 31, 2002). The invention is intended to protect sensors and electronic parts from degradation and destruction under pressure in vulcanization. The sensors and electronic parts are mounted on a circuit board and sealed in a housing, forming a transponder. A green tire with the transponder embedded between the inner liner and the carcass ply is vulcanized. After the vulcanization, the tips of protrusions of the housing are removed together with part of the surface of the tire's inner wall, so as to form openings on the tips of the protrusions through which the sensor in the housing communicate with an air reservoir of the tire.

A still further example is found in Japanese Unexamined Patent Publication 2004-90775 (Tokukai 2004-90775; published Mar. 25, 2004). The invention is intended to prevent fracturing of an inexpensive film-shaped electronic device if it is mounted. The film-shaped electronic device, freely slidable in sheet-shaped members provided on both surfaces of the film-shaped electronic device, is attached inside the tire or on the surface of the tire.

Still another example is found in Japanese Utility Patent Publication 7-42514/1995 (Jitsukaihei 7-42514; published Aug. 4, 1995). The invention is intended to provide a sealed structure for a data carrier by a simple molding step which yet gives sufficient strength without degrading the performance of the data carrier. The data carrier has a rubber- and/or gel-like substance covering at least around a coil. The entire data carrier is sealed with a sealing resin.

A further example is found in Japanese Unexamined Patent Publication 11-85935/1999 (Tokukaihei 11-85935; published Mar. 30, 1999). The invention is intended to prevent an antenna coil from breaking due to deformation of an article itself containing a non-contact data carrier package. The antenna coil used is made of a metal line folded like a bellow before being wound.

Another example is found in Japanese Unexamined Patent Publication 2003-302290 (Tokukai 2003-302290). The invention is intended to provide a temperature measuring data carrier which is capable of precisely measuring the continuously changing temperature of a heated object in real time. The data carrier contains a base consisting of at least a temperature sensor section, a memory section, a wireless communications section, and a control section. The base has a surface covered with a thermally insulating protection layer.

These methods and devices however give rise to problems if, for example, the devices are mounted to automobile tires or like articles which expand, shrink, and deform repeatedly in use. The non-contact data carrier package may break in harsh operating environment. The tire or like article itself may be damaged. Cost may increase.

In view of the problems, the present invention has an objective to provide a method of securing a wireless IC tag which does not break if it is attached tires and other articles which are used in harsh operating environment. It is also an objective of the invention to provide an article carrying such a wireless IC tag and a vehicle to which such an article is attached.

DISCLOSURE OF INVENTION

To address the problems, the wireless IC tag securing method, wireless IC tag carrying article, or vehicle carrying the wireless IC tag carrying article of the present invention is characterized by: covering an entire first surface of a wireless IC tag with an unvulcanized rubber having identical properties to an unvulcanized rubber constituting an article to which the wireless IC tag will be secured, the wireless IC tag including memory means for storing data and wireless transmission means for wirelessly transmitting data; mounting a second surface of the wireless IC tag which is opposite the first surface to the article before vulcanization; and vulcanizing the article and the wireless IC tag to secure the wireless IC tag to the article.

In the present invention, the entire first surface of the wireless IC tag is covered with an unvulcanized rubber having identical properties to the unvulcanized rubber constituting the article to which the wireless IC tag will be secured. The unvulcanized rubber, composed of uncrosslinked molecules, undergoes plastic deformation and, thanks to the deformation, can protect the wireless IC from external forces.

The plastic deformation renders uniform the stress acting on the wireless IC during vulcanization. In other words, the unvulcanized rubber serves as a buffer layer. Uniform pressure is exerted on the surface of the wireless IC. Thus, the wireless IC tag main body, made of a brittle material, becomes resistant to stress. The wireless IC is therefore protected from damage during vulcanization.

The unvulcanized rubber is denatured by the vulcanization for improved elasticity and durability, to have identical properties to the article to which the wireless IC tag will be secured. The use of the unvulcanized rubber having identical properties, even if the wireless IC is secured to an article in harsh operating environment, enables solid protection of the wireless IC from damage when the article is in use.

If, for example, an elastomeric or other elastic material is used in place of the unvulcanized rubber, the wireless IC receives an external force due to the repulsive force generated by elastic deformation. The wireless IC is not sufficiently protected.

The article includes in the scope thereof tires for vehicles, such as automobiles and trucks, and means of transport, such as motorcycles and bicycles, as well as things constructed of an article having a rubber member, such as sports and other shoes with a rubber member as soles and rubber balls for basketball and other sports.

The memory means includes in the scope thereof things constructed of a data storage device, such as a non-volatile memory.

The transmission means includes in the scope thereof things constructed of a data transmission device with an antenna, etc. or a communications device for data transmission/reception with an antenna, etc.

The wireless IC tag includes in the scope thereof things constructed of a tag containing an IC for wireless communications, such as those types which include control means, such as a CPU or an MPU, to carry out data transmission and those which include no control means, but operate in accordance with signals received through a communications device.

The data includes in the scope thereof things constructed of information which is requested for management, such as manufacture management, delivery management, distribution management, or maintenance management. Specifically, the data includes things constructed of unique information of an individual article, such as the model number, serial number, specifications, properties, process history, and usage history of the article and any combination of these.

When the opposite surface of the wireless IC tag is attached to the article before vulcanization, it is desirable to attach it by adhesion. However, it is also possible to attach it simply by placing or equipping the article and IC tag with an engagement projection and a cavity.

Attachment by adhesion desirably leaves no gaps or voids and includes complete adhesion or excess void- and excess gap-free adhesion of the wireless IC tag and the article. Incidentally, it is desirable if the IC tag is adhered so that when the article deforms, the wireless IC tag does not deform to a different shape from the deformed article.

If the adhesion leaves no gaps or voids in this manner, the wireless IC tag, even if formed like a thin film, deforms in line with the deformed article. This prevents excess deformation of only the wireless IC tag, which may lead to breakage. Therefore, The antenna is protected from line breaks and other damage.

The vehicle includes in the scope thereof things constructed of a vehicle with a rubber tire, such as an automobile, a motorcycle, bicycle, etc.

The features enable the unvulcanized rubber (functioning as a protect member) covering the wireless IC tag to alleviate the pressure exerted on the wireless IC tag due to the pressurization in the vulcanization step. Accordingly, the wireless IC tag is protected from damage and maintains the functions of the wireless IC tag.

As an embodiment of the invention, the wireless IC tag may be secured to the article at a place other than the joint of the unvulcanized rubber constituting the article.

Accordingly, the wireless IC tag is prevented from being damaged by the joint of the unvulcanized rubber during vulcanization.

The present invention enables the unique information of an individual article from the wireless IC tag mounted to the article. Especially, the wireless IC tag does not fade like bar codes or engravings. When the IC tag is mounted to the interior of the article, the unique information is still obtainable by wireless communications. So, the unique information is obtainable in any of the sale, use, and disposal stages of the article.

Additional objects, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 4 is an illustration of manufacturing steps for an IC tag-carrying tire.

FIG. 10 is a perspective view of an automobile.

FIG. 11 is an illustration of a conventional IC tag-carrying tire.

BEST MODE FOR CARRYING OUT INVENTION

Embodiment 1

The following will describe a first embodiment of the present invention in reference to FIG. 1 to FIG. 10. The embodiment has an objective to provide a wireless IC tag that is not damaged if mounted inside a tire or like article (i) which is elastic, pliable, and repeatedly deformed in use and (ii) which is subjected to harsh operating environment where it is exposed to high temperature and high pressure for example, during manufacture and in use. It is also an objective to provide a method of mounting such a wireless IC tag and a tire carrying the wireless IC tag.

Figure 1:
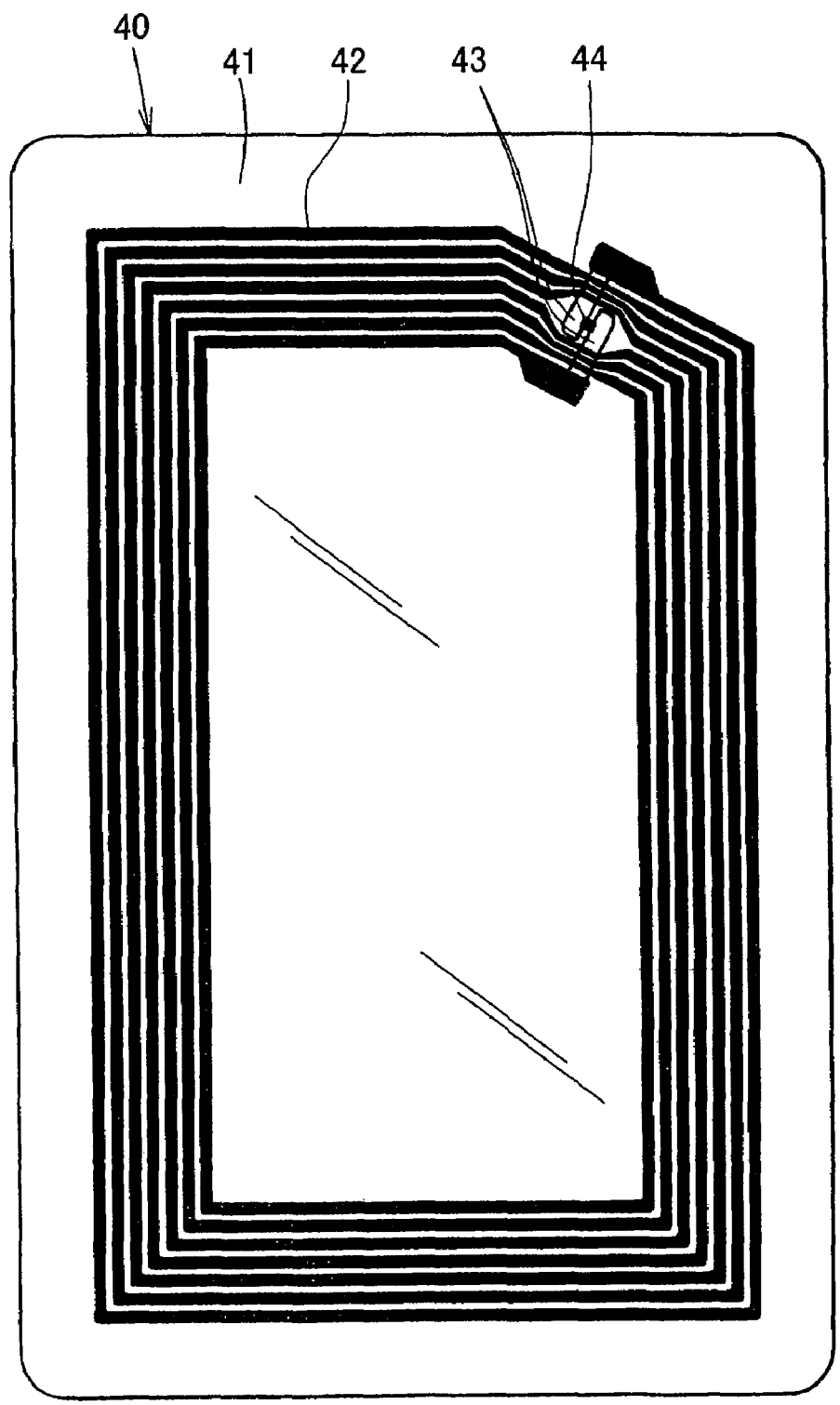
FIG. 1 is a plan view of the main body of an IC tag.
Figure 2:
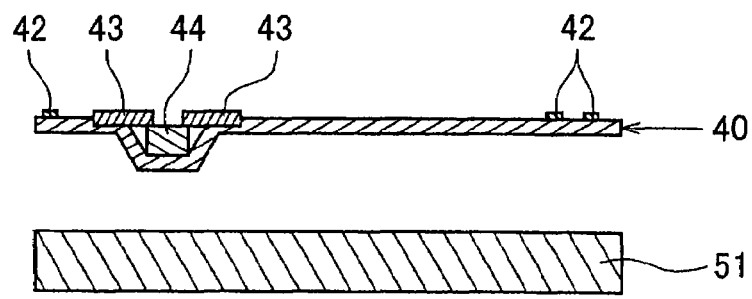
FIG. 2 is an illustration of manufacturing steps for a tire-mounted IC tag.
Figure 2:
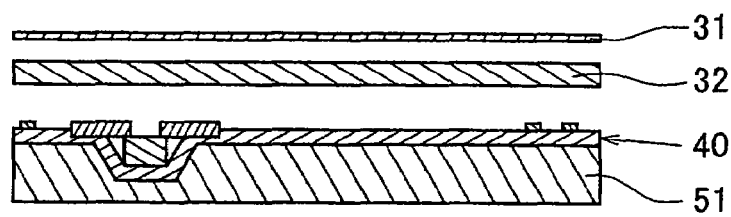
Figure 2:
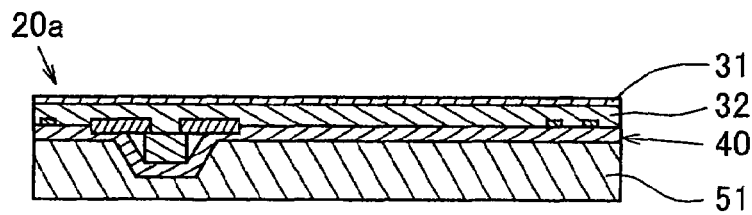

FIG. 1 is a plan view of an IC tag main body 40 used in a tire-mounted IC tag 20a.

The IC tag main body 40 includes a coil 42, a substrate 43, and an IC 44 all provided on a label 41 made of a plastic or like resin. The IC tag main body 40 is made from a sufficiently flexible and pliable, thin IC label which is a rectangle when viewed from top. The overall size of the IC tag main body 40 may be comparable to or slightly exceeds that of a thumb. The body 40 is a thin sheet. In the current embodiment, the body 40 is shaped like a card. These are however by no means limiting the size and shape of the IC tag main body 40.

The coil 42 is a conductive wire wound like a spiral along the edge of the label 41, functioning as an antenna. In the present embodiment, the coil 42 is connected to the substrate 43 which is located close to a corner. The IC 44 is connected to the substrate 43.

The IC 44 contains a memory section storing data and a control section executing control operation.

The IC tag main body 40 may be, for example, the thin IC label proposed in Japanese Unexamined Patent Publication 2001-156110 (Tokukai 2001-156110) or a similar IC tag. Such an IC tag, as popularly known, contains a resonator circuit, a rectifier circuit, a voltage sensor circuit, a control circuit, a constant voltage circuit, etc.

The coil 42 and substrate 43 are disposed on the thin, flat label 41. The IC 44 is disposed between the substrate 43 and the label 41. To this end, a part of the label 41 projects opposite the coil 42 and the substrate 43 to form a cavity. The IC 44 is placed inside the cavity.

Configured as above, the IC tag main body 40 is able to receive electromotive force through the coil 42 when in a magnetic field generated by a query device or like communications device (not shown). The control section executes control operation in accordance with incoming signals. The data in the memory section is transmitted.

Next, referring to cross-sectional side views in FIGS. 2(A) to 2(C) illustrating manufacturing steps for the tire-mounted IC tag 20a, the manufacturing steps for the tire-mounted IC tag 20a using the IC tag main body 40 will be described.

<First Step A>

First step A will be described first in reference to the cross-sectional side view in FIG. 2(A). A protective sheet 51 is stacked on a projecting side of the IC tag main body 40 on which the IC 44 is disposed. The protective sheet 51 is made of an unvulcanized pliable rubber member exhibiting some plastic deformation property.

The projecting side is the side of the substrate 43 on which a conductor circuit containing the IC 44 is formed. In other words, the projecting side is the one opposite the side where the substrate 43 is attached to a tire. In the figure, the side is depicted as the bottom.

The unvulcanized rubber member is preferably an unvulcanized SBR (styrene-butadiene rubber), an NBR (acrylonitrile-butadiene rubber), an ethylene propylene rubber, a silicon rubber, butadiene, polyisoprene (natural rubber), etc. The unvulcanized rubber member has identical properties to those of the rubber member used for the tire 10 (especially, the inner liner 14). Here, the "identical properties" means that the members possess properties as unvulcanized rubber, that is, plastic deformation property and exhibit elasticity through vulcanization.

The IC tag main body 40 may be stacked on the protective sheet 51 which is a sheet of the above rubber member by lamination. Alternatively, the main body 40 may be applied to the protective sheet 51 using a calendar, for example.

The protective sheet 51 is formed thicker than the IC 44 (for example, by two to five folds), preferably about twice as thick as the IC 44.

<Second Step B>

Next, in second step B, as shown in FIG. 2(B), an adhesive agent 32 is applied to the back surface (bottom in the figure) of the substrate 43 on which the conductor circuit containing the IC 44 is formed in the IC tag main body 40. The agent 32 has a good adhesion property with the raw material (for example, SBR) of the tire to which the IC tag 20a is mounted.

The adhesive agent 32 may be a rubber-based adhesive agent which is flowable at high temperature and high pressure and directly applied using a blade or a roll coater or by a like method. Alternatively, the adhesive agent 32 may be temporarily applied to a separator sheet (peel sheet) 31 before being transferred to the IC tag main body 40.

The separator sheet 31 is, for example, a paper base (paper sheet) having silicon applied to the surface thereof so that the sheet 31 does not stick to the adhesive agent 32.

As a result of these two steps A and B, the tire-mounted IC tag 20a is finished as shown in the cross-sectional side view of FIG. 2(C). The tire-mounted IC tag 20a can be adhered to a tire by means of an adhesive layer of the adhesive agent 32.

If the adhesive agent 32 is adhesive at room temperature, the tire-mounted IC tag 20a may be used like a sticker. The separator sheet 31 introduced in step B is removed before use.

In cases like this, the tire-mounted IC tag 20a is readily fixed at a predetermined position. Another advantage is that the tire-mounted IC tag 20a can be used even in vulcanization and other preceding steps.

Next, the tire-mounted IC tag 20a fabricated in steps A and B above is attached to a tire in steps C and D.

Figure 3:
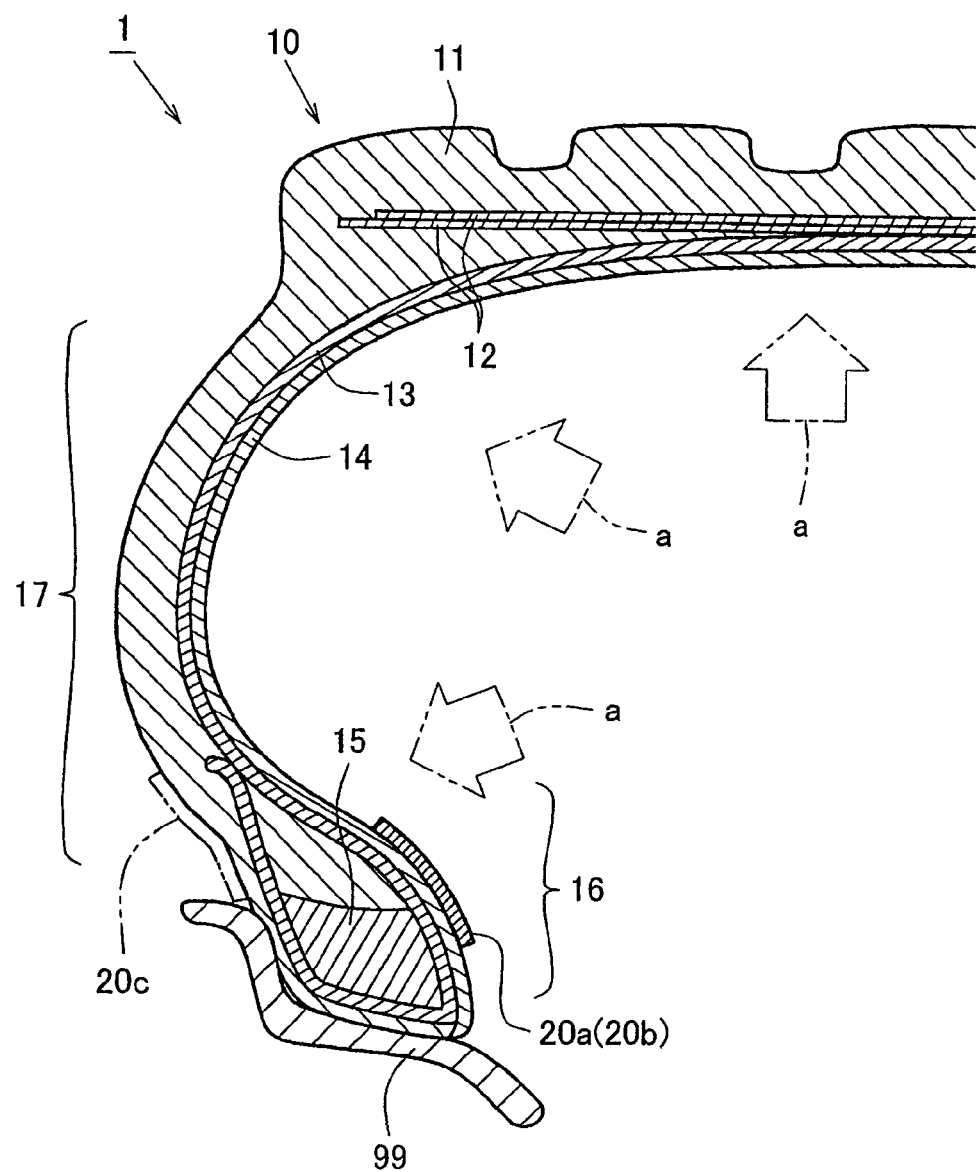
FIG. 3 is a cross-sectional view of a tire along its radius.

FIG. 3 is a cross-sectional view of a tire along its radius. The tire 10 to which the tire-mounted IC tag 20a will be attached is constructed of a tread 11, a belt 12, a carcass 13, an inner liner 14, a bead base 15, and a bead 16 as shown in FIG. 3.

The tread 11 is an outer skin of the tire and protects the carcass 13 from abrasion and external damage.

The belt 12 is a reinforcement extending along the circumference between the tread 11 and carcass 12 of the radial structure.

The carcass 13 is a fiber or steel wire framework of the tire. The carcass 13 supports the tire structure against load, shock, and internal air pressure.

The inner liner 14 a tube-equivalent rubber layer attached inside the tire.

The bead base 15 fixes the tire to a rim 99.

The bead 16 is a bundle of high-carbon steel and supports the carcass cord from both sides to fix the tire to the rim 99.

To the tire 10 arranged in this manner, the tire-mounted IC tag 20a is attached as below.

<Third Step C>

In third step C, as shown in the cross-sectional side view of FIG. 4(A), the adhesive agent 32 of the tire-mounted IC tag 20a is adhered to the inner liner 14 of the tire 10 to which the IC tag 20a is mounted.

Figure 5:
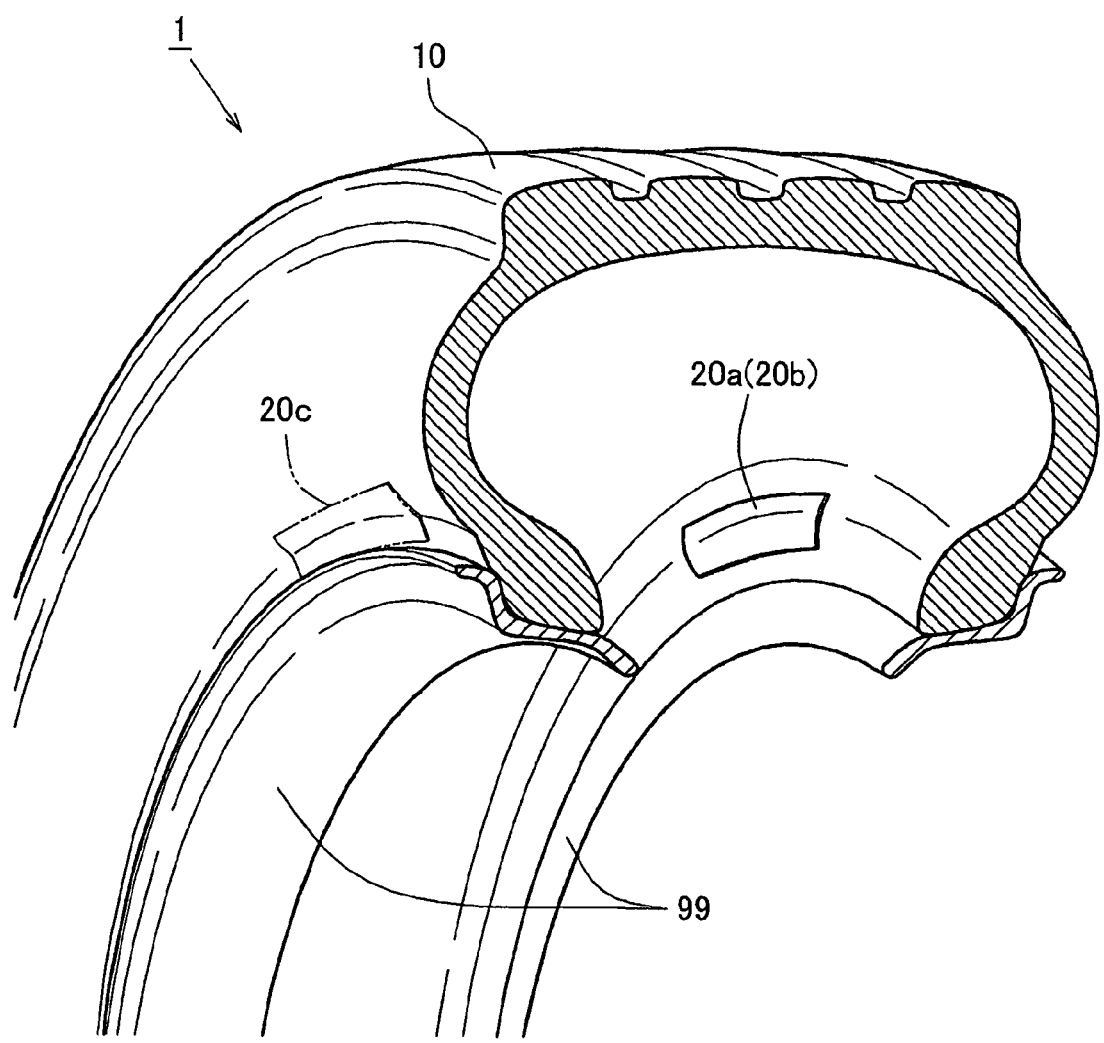
FIG. 5 is a partial perspective view of an IC tag-carrying tire.
Figure 6:
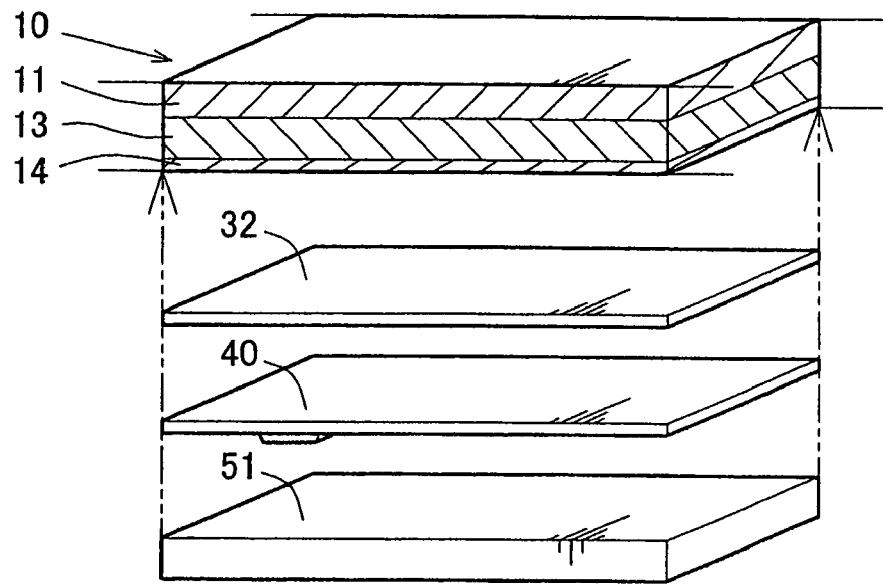
FIG. 6 is an illustration of adhesion effect.
Figure 6:
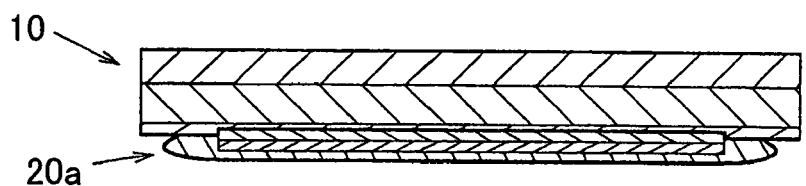
Figure 6:
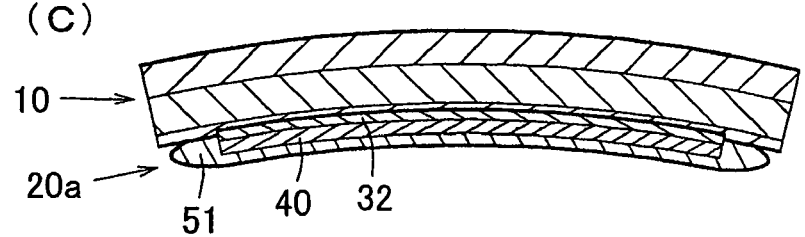
Figure 6:
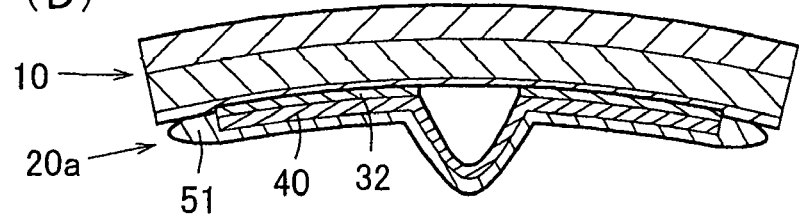
Figure 7:
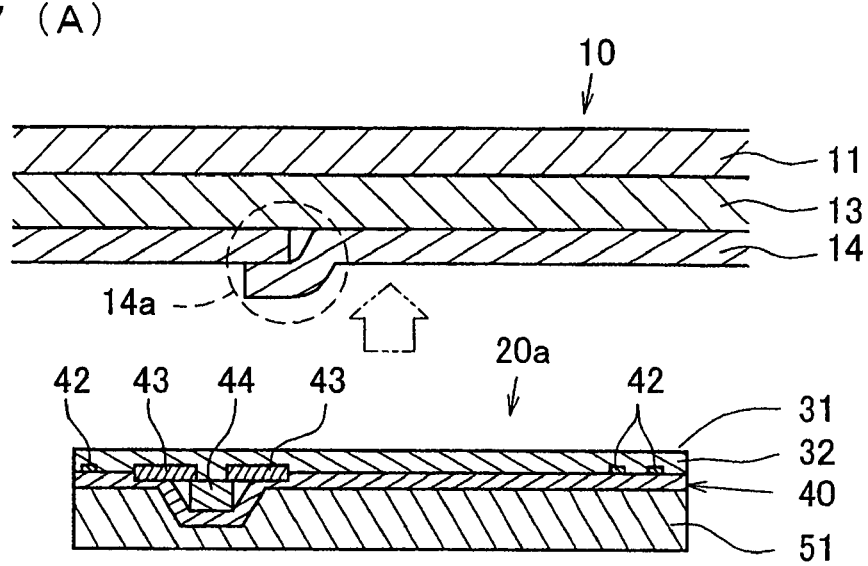
FIG. 7 is an illustration of a defect when adhered to a joint.
Figure 7:
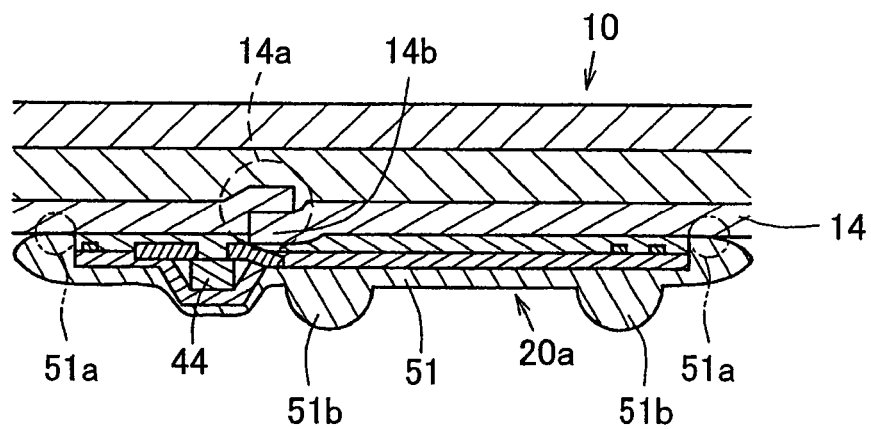
Figure 8:
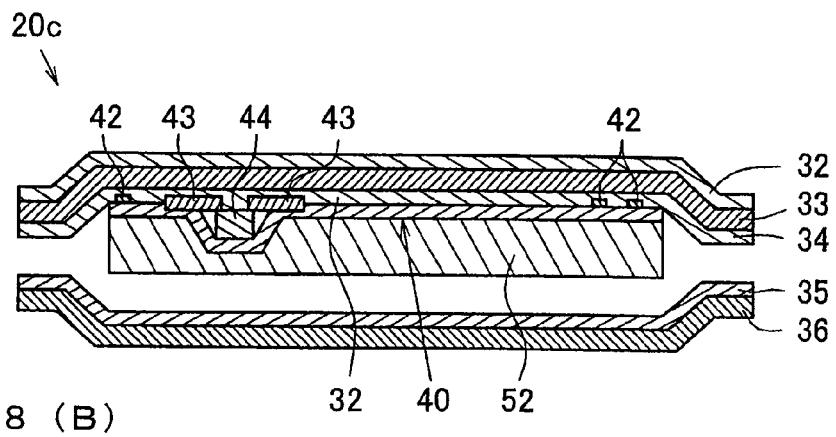
FIG. 8 is an illustration of manufacturing steps for an IC tag-carrying tire in a second embodiment.
Figure 8:
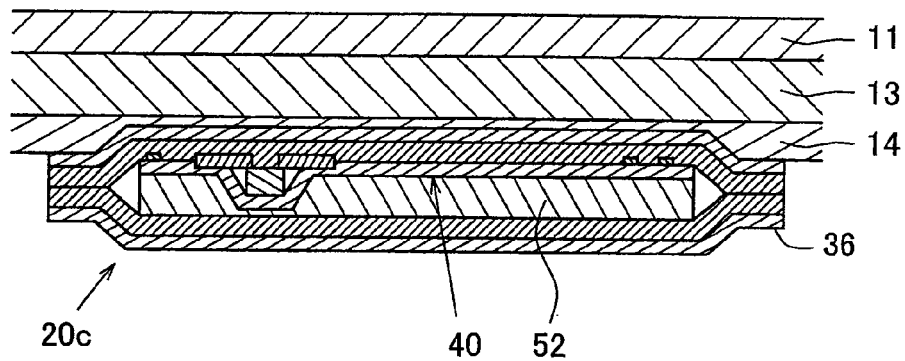
Figure 8:
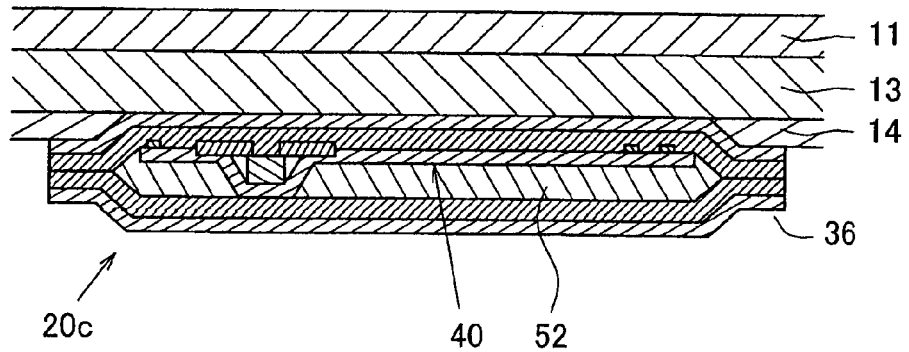
Figure 9:
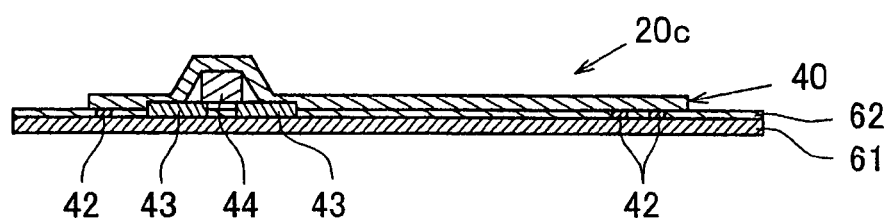
FIG. 9 is an illustration of manufacturing steps for an IC tag-carrying tire in a third embodiment.
Figure 9:
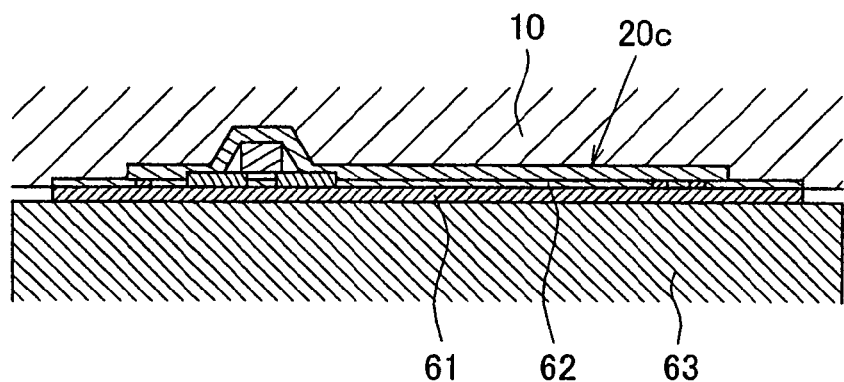

The adhesion position is specified close to the bead 16 (see FIG. 3) inside the tire 10 as shown in the partial perspective view of the IC tag-carrying tire 1 in FIG. 5. It is avoided to adhere the tire-mounted IC tag 20a to a side wall 17 shown in FIG. 3 where the tire 10 shows especially large deformation while the car is running. It is also avoided to adhere the tag 20a to a rim contact surface of the tire 10 where the tire 10 comes in contact with the rim 99, to prevent damage.

It is also avoided to adhere the tire-mounted IC tag 20a to a joint of the thin rubber sheet of the inner liner 14 where both ends thereof are connected together to form a circular body.

<Fourth Step D>

Next, in fourth step D, vulcanization is carried out to impart flexibility and durability to the tread 11, inner liner 14, and other rubber members (for example, SBR) of the tire 10.

In this vulcanization step, or fourth step D, the tire is placed in a metal mold. Then, a pressure of about 25 atm and a temperature as high as about 180° C. are applied radially from the inside of the tire 10 toward the outside, which direction is indicated by virtual arrows "a" in FIG. 3 inside the tire 10.

The atmospheric pressure value given above is only an ideal one and may be variable approximately from 20 atm to 30 atm. The temperature value is also an ideal one and may be variable approximately from 160° C. to 200° C.

In the vulcanization process, the IC tag main body 40 adhered to the tire 10 is subjected to the same high temperature and pressure as the tire 10 which are harsh process conditions.

The front side of the IC tag main body 40 (opposite the tire 10) is covered with the protective sheet 51. The sheet 51 is made of a pliable rubber member capable of plastic deformation which is an unvulcanized SBR.

The protective sheet 51 serves as a buffer layer against the pressure, alleviating the pressure exerted on the IC tag main body 40.

Further, the protective sheet 51 is more pliable than the tire 10 (inner liner 14) to which the IC tag 20a is mounted. This is because the tire 10 is reinforced by fiber, for example, and the protective sheet 51 made of unvulcanized rubber is less rigid than the tire 10. Being relatively pliable and deformable, the protective sheet 51 hence undergoes plastic deformation under the heat and pressure during vulcanization and fits onto the IC tag main body 40, as shown in the cross-sectional side view of FIG. 4(B).

The plastic deformation results in uniform stress acting across the IC tag main body 40 during the vulcanization. With the protective sheet 51 made of unvulcanized rubber serving as a buffer layer, uniform pressure is exerted across the surface of the IC tag main body. Thus, the IC tag main body, made of brittle material, becomes resistant under stress. The IC tag main body 40 is therefore protected from damage during the vulcanization.

The thermal insulation effect of the protective sheet 51 having a suitable thickness protects the IC 44 from high temperature during the vulcanization.

Possessing plastic deformation property, the protective sheet 51 shows plastic deformation under heat and pressure and expands by one size. The sheet 51 thus sticks through fusing to the tire 10 (inner liner 14) along an edge (periphery) 51a of the IC tag main body 40. The expansion further secures the IC tag main body 40 to the tire 10.

In this fashion, the IC tag main body 40 is enclosed, hence completely sealed, by the tire 10 (inner liner 14) and the protective sheet 51.

By these steps A to D, the IC tag-carrying tire 1 is manufactured which gives durable data reading performance. Also by steps A to D, the tire-mounted IC tag 20a is not damaged if vulcanized together with the tire 10 and firmly sticks to the tire 10 (inner liner 14) through fusing during vulcanization.

More specifically, the adhesive agent 32, IC tag main body 40, and protective sheet 51 are sequentially adhered to the tire 10 in steps A to D as illustrated in cross-sectional side view of FIG. 6(A).

In the vulcanization step, or fourth step D, the protective sheet 51 deforms and covers the IC tag main body 40 as shown in FIG. 6(B). Further, the adhesive agent 32 adheres the whole adhesion side surface of the IC tag main body 40 securely to the tire 10, leaving no gap or void therebetween.

Therefore, if the tire 10 deforms, for example, when the vehicle is running, the tire-mounted IC tag 20a itself deforms in the same shape as the tire as shown in FIG. 6(C).

If the adhesive agent 32 left a gap with the tire-mounted IC tag 20a being partially separated from the tire 10, the tire-mounted IC tag 20a would deform, but assume a different shape from the tire 10 as shown in FIG. 6(D). This is because the tire-mounted IC tag 20a is less thick than the tire 10 and would bend in any direction it could bend.

If such a situation did occur, the IC tag main body 40 would bend at a sharp angle and likely cause line breaks. In actuality, the tire-mounted IC tag 20a is firmly adhered to tire 10 with no gap being left therebetween as shown in FIG. 6(C). This prevents the situation from occurring.

As describe above, as a result of fabrication of the IC tag-carrying tire 1, the tire-mounted IC tag 20a becomes resistant to high temperature, high pressure, and bending. Also, the IC tag main body 40 does not break down when it is adhered to the tire 10 and is not damaged while the vehicle is running.

The tire 10 deforms repeatedly in ordinary use. The IC tag main body 40 mounted inside the tire 10 also experiences bending forces repeatedly. In addition, heat is applied to the IC tag main body 40 from the tire 10 which is heated to high temperature from friction with the road surface and for other causes.

However, the material used to mount the IC tag main body 40 inside the tire 10 securely and firmly adheres to the elastic tire 10 under high temperature, high pressure process conditions by the adhesive agent 32 filling up any space at the interface. By the vulcanization, the material is also denatured for improved elasticity and durability, to have identical properties to the tire 10.

Therefore, the bend radius of the coil 42 which is a component of the IC tag main body 40 can be kept at a large value. No cracks or like defects due to difference in deformation capability of materials develop. The bend radius of the coil 42 is defined as the radius of the coil 42 in reference to the center of curvature when the tire 10 deforms and the coil 42 on the tag attached to the tire 10 bends accordingly.

The area near the bead 16 where the tire-mounted IC tag 20a is adhered experiences the least deformation when the tire is in use. In addition, in that area, the carcass 13 is closest to the internal surface of the tire 10.

In other words, the tire-mounted IC tag 20a is firmly attached near the carcass 13 which shows only a little deformation. Therefore, the bend radius of the tag 20a is never large. The structure thus prevents line breaks due to fatigue caused by repeated bending of the coil 42 which is a part of the IC tag main body 40.

Since the side of the substrate 43 where the IC tag main body 40 of the tire-mounted IC tag 20a is mounted is placed near the surface of the hard carcass 13 in this manner, faulty contacts do not occur on the IC 44, and short-circuiting is prevented between the IC 44 and the coil 42 which is a conductor circuit.

The substrate 43 on which the IC 44 is mounted deforms as little as the tire 10. Line breaks due to deformation are also prevented.

In fourth step D, the deformation of the periphery of the IC tag main body 40 is absorbed by the protective sheet 51. Therefore, faulty contacts do no occur on the IC. Deformation of the substrate 43 on which the IC 44 is mounted is also prevented which would otherwise cause, for example, a short-circuit between the IC 44 and the conductor circuit.

In addition, fabrication is possible by lamination which is suited to mass production. Manufacture cost is kept inexpensive.

The tire-mounted IC tag 20a can be attached inside the tire 10; the IC tag main body 40 is therefore protected from external mechanical stress load when the tire is in use.

Further, it is avoided to attach the tag 20a at the joint of the rubber sheet constituting the tire 10; the tire-mounted IC tag 20a is not damaged.

To explain in more detail, the both ends of the thin rubber sheet of the tire 10 are joined by a joint 14a to form a circle as shown in the cross-sectional side view of FIG. 7(A), At the joint 14a, there develops a step as shown.

If the IC 44 of the tire-mounted IC tag 20a or the substrate 43 on which the conductor circuit is formed was placed at the joint 14a in third step C detailed above, and the tire was subjected to the vulcanization step under a pressure of about 25 atm and a temperature as high as about 180° C. with these components so placed, the tire-mounted IC tag 20a would be damaged as shown in the cross-sectional side view of FIG. 7(B).

In other words, the periphery of the IC 44 would deform due to a convex 14b made by the step at the joint 14a. The deformation could cause faulty contacts between IC electrodes and the conductor circuits, for example.

In the vulcanization step, a convex 51b is formed on the internal surface of the tire 10 by an air-venting groove (vent mark line) on the surface of a metal mold (ladder) used in the vulcanization step. Deformation of the convex 51b, on top of deformation of the convex 14b, would make faulty contacts more likely to occur between IC electrodes and the conductor circuit.

Incidentally, the deformation of the convex 51b formed by the vent mark line can be absorbed by the plastic deformation of the protective sheet 51 on the surface of the tire-mounted IC tag 20a. Therefore, if the tire-mounted IC tag 20a is disposed on the tire 10 so that the IC 44 of the tire-mounted IC tag 20a or the substrate 43 on which the conductor circuit is formed is not placed at the convex 14b formed by the step at the joint 14a, the problem of faulty contacts between the IC electrodes and the conductor circuit in vulcanization is solved.

Embodiment 2

Next, a tire-mounted IC tag 20b which is a second embodiment will be described in reference to the cross-sectional side views of FIG. 8(A) to FIG. 8(C).

In this embodiment, the protective sheet 51 of the first embodiment is replaced by a protective layer 52 being either applied or stacked. The layer 52 is made of a thermoplastic rubber member which fuses at high temperatures. The layer 52 is sandwiched by, for example, vulcanized rubber sheets 33, 36 having some flexibility and durability, so as to form the tire-mounted IC tag 20b.

The tag 20b is attached to the tire 10 by the adhesive agent 32 applied to the back of the substrate 43 constituted by a conductor circuit on which the IC 44 is mounted.

<First Step F>

In first step F, the protective layer 52 is applied to the side of the IC tag main body 40 which protrudes due to the mounting of the IC 44 as shown in FIG. 8(A). The layer is formed by applying a urethane-based resin material which starts softening at a temperature around 150° C. using a roll coater or blade coater, for example the temperature value given here is an ideal one and may be variable approximately from 130° C. to 170° C.

Next, the rubber sheets 33, 36 are secured by lamination or another process via adhesive agents 34, 35 to the respective sides of the IC tag main body 40 to which the protective layer 52 is applied. The sheets 33, 36 are an SBR having a thickness of about 0.1 mm which has been subjected to vulcanization and is thus elastic. The thickness value is an ideal one and may be variable approximately from 0.05 mm to 0.15 mm.

These adhesive agents 34, 35 are preferably of the same kind as the adhesive agent 32 which attaches the IC tag main body 40 to the tire: for example, a rubber-based adhesive agent.

The rubber sheets 33, 36 secured to the respective sides of the IC tag main body 40 are larger in area than the IC tag main body 40 so as to create, around the IC tag main body 40, edges where the rubber sheets 33, 35 are secured. The IC tag main body 40 is hence sealed by the rubber sheets 33, 36.

<Second Step G>

Next, in second step G, the tire-mounted IC tag 20b fabricated in step F is attached to the tire 10 (inner liner 14) using the adhesive agent 32 as shown in FIG. 8(B). The position and attachment method is the same as in the first embodiment.

<Third Step H>

Next, in third step H, the tire is vulcanized as shown in FIG. 8(C). In the tire-mounted IC tag 20b, the protective layer 52 has a softening temperature that is lower than the vulcanization temperature. At high temperature of the vulcanization step, the layer 52 softens and serves as a buffer for the IC 44 at high pressure.

The flow of the softened protective layer 52 is limited to horizontal directions by the stacked rubber sheets 33, 36. The flow therefore does not degrade the stress buffering function due to a decrease in film thickness.

The protective layer 52 absorbs heat when the layer 52 softens and fuses, which reduces heat conductivity. Less heat flows into the IC 44. The IC 44 is protected from heat.

By manufacturing the IC tag-carrying tire 1 containing the tire-mounted IC tag 20b in the above manner, the IC tag main body 40 is not broken when adhered to the tire 10 and not damaged due to traveling of the vehicles.

The protective layer 52 made of a thermoplastic rubber member absorbs heat as heat of fusion when the layer 52 fuses. Further, the liquefaction of the protective layer 52 reduces heat conductivity, lowering the temperature applied to the IC 44.

In addition, the aforementioned, dissolved thermoplastic rubber member (protective layer 52) is sealed between the rubber sheets 33, 36 located on and beneath that member, thereby preventing the tire-mounted IC tag 20b from flowing out. Therefore, the IC 44 is under uniform pressure. The resultant tire-mounted IC tag 20b is thus more resistant to high temperature and high pressure, compared to the tire-mounted IC tag 20a of the first embodiment.

Embodiment 2 described above has other features and effects which are the same as those of embodiment 1. The same members are indicated by the same numerals, and detailed description thereof is omitted.

Embodiment 3

Next, A tire-mounted IC tag 20c which is a third embodiment will be now described in reference to the cross-sectional side view of FIG. 9(A) and FIG. 9(B). In this embodiment, the tire-mounted IC tag 20c is attached to the exterior of the tire 10.

<First Step J>

First, as shown in the cross-sectional side view of FIG. 9(A), a sheet material 61 is stacked via the adhesive agent 62 on the back of the substrate 43 where a conductor circuit which contains the IC 44 of the IC tag main body 40 is formed The adhesive agent 62 applied in advance to the sheet material 61. The sheet material 61 is unvulcanized rubber member having identical properties to the SBR which is a raw material for the tire. The sheet material 61 is 0.1 mm thick and is slightly larger than the IC tag main body 40 in area.

The adhesive agent 62 used here is a rubber-based adhesive agent which is flowable at high temperature and high pressure and direct applied to the sheet material 61 using a blade or a roll coater or by a like method. Alternatively, the adhesive agent 62 may be temporarily applied to a sheet which is made of a paper base with silicon applied to the surface thereof, so that the sheet dose not stick to the adhesive agent 62. Thereafter, the adhesive agent 62 is transferred to the sheet material 61 so that the adhesive agent 62 is stacked on the sheet material 61.

The sheet material 61 is an SBR. By making the sheet material 61 from the same raw material as the tire 10, cracks are prevented from developing around the IC tag main body 40 due to differences in quantity of deformation when the tire is in use. For the same reason, the IC tag main body 40 does not peel off.

<Second Step K>

Next, in second step K, the tire-mounted IC tag 20c is attached to the tire 10 as shown in the cross-sectional side view of FIG. 9(B).

To do that, the attachment position of the tire-mounted IC tag 20c is specified in proximity of the bead 16 (see FIG. 3) on the surface of the unvulcanized tire 10 before the tag 20c is attached.

The adhesive agent 62 is of the same size as the sheet material 61 which is larger in area than the IC tag main body 40 so as to create edges around the IC tag main body 40. The tag 20c is attached by pressing those edges of the adhesive agent 62 to the tire 10 (tread 11).

<Third Step L>

Next, in third step L, the entire unvulcanized tire 10 is placed in a metal mold in the tire 10 is vulcanized by applying a temperature as high as about 180° C. and a pressure of about 25 atm radially from the inside of the tire 10 toward the outside. This imparts high elasticity and durability to the rubber member to finish the manufacture of the tire 10.

At this stage, the sheet material 61 for the tire-mounted IC tag 20c is positioned in contact with the surface of the hard metal mold 63. Deformation of the substrate 43 to which the IC 44 is mounted is prevented. Further, the unvulcanized rubber member, of the tire 10 (tread 11), which is capable of plastic deformation serves to prevent high pressure from acting on the IC 44. In addition, the IC tag main body 40 and the tire 10 are joined at their interface under the application of high temperature and high pressure during vulcanization.

With these steps, the tire-mounted IC tag 20c contains a reduced number of parts than the tire-mounted IC tag 20 (or 20a, 20b, 20c, individually) and fabricated at reduced cost.

The unvulcanized tire 10 is vulcanized after being placed in the metal mold. At that stage, the surface of the tire-mounted IC tag 20c on which the substrate 43 carrying the IC 44 is attached is placed on the surface of the metal mold 63 which is a hard base material. Therefore, the opposite surface has the same structure as the tire-mounted IC tag 20a of the first embodiment covered with a plastic rubber member.

Embodiment 3 described above has other features and effects which are the same as those of embodiment 1. The same members are indicated by the same numerals, and detailed description thereof is omitted.

The IC tag-carrying tire 1 of the embodiments described above enables a query device, for example, to stably read the unique information of individual tires (e.g., model number, serial number, specifications, properties, process history, and usage history) from the IC tag main body 40 as data, no matter how old and how the tire has been used.

Accordingly, problems which may occur when the simply IC tag is mounted to the tire 10 are addressed.

non-contact IC tags, like the conventional IC tag, is capable of containing a large quantity of information in the IC. The IC tag is readable at distances from a few centimeters to a few meters by a non-contact method. The IC tag is still readable if the tag is inside the tire.

However, some tire manufacturing steps, like the vulcanization step, inherently involve high temperature and high pressure. In addition, the tire may deform in use or may be heated to high temperature due to friction with the road surface or for other causes.

Therefore, simply mounting the non-contact IC tag to the tire may result in the non-contact IC tag being exposed to high temperature, high pressure, and other harsh environment and repeatedly bent. These conditions and deformation could break the IC, coil, and joints therefor which are components constituting the non-contact IC tag.

To prevent the non-contact IC tag from breaking, the IC section 123 of a non-contact IC tag 124 is sealed with a resin, such as epoxy resin 121, as shown in the cross-sectional side view of FIG. 11(A). Further, the coil is made of a copper wire 122, for example, which is relatively resistant to bending with a diameter of about 0.1 mm.

However, with these methods, the non-contact IC tag 124 loses pliableness thereof if the tag 124 is solidly attached to a tire 127 made of an elastic rubber member using an adhesive layer 126 as shown in FIG. 11(B). Cracks may develop inside the tire due to difference in deformation ability between the non-contact IC tag 124 and the tire 127, which could undermine safety provided by the tire.

Further, the hard epoxy resin 121 may break because the resin 121 cannot follow the elastic deformation of the tire 127. The internal IC section 123 will likely break contrary to expectations. Further, the methods add to the manufacturing steps for the non-contact IC tag and to the cost of the non-contact IC tag.

Each of the aforementioned embodiments is able to solve these problems. The user can obtain the unique information of individual tires using, for example, a query device as data in a stable manner.

Especially, the side of the IC tag main body 40 opposite the side thereof where the body 40 is secured to the tire 127 is covered with an unvulcanized rubber having identical properties to the unvulcanized rubber constituting the tire 127 to which the body 40 is secured. The whole tire is vulcanized in this state, which makes it possible to integrate the IC tag main body 40 into the tire 127.

Unlike the technology disclosed in the prior art documents described earlier in the BACKGROUND ART section, the use of an unvulcanized rubber having identical properties enables reliable protection of the IC tag main body 40 secured to the tire 1 in harsh operating environment from being damages when the tire 1 is in use. In each of the embodiments, one of the sides of the IC tag main body 40 is covered with an unvulcanized rubber (protective sheet 51, protective layer 52, or sheet material 61) which have identical properties to the unvulcanized rubber constituting the tire 1. In unvulcanized rubber, molecules are not crosslinked and shows plastic deformation. The plastic deformation renders uniform the stress acting on the IC tag main body 40 during vulcanization. In other words, the unvulcanized rubber serves as a buffer layer. Uniform pressure is exerted across the surface of the wireless IC. Thus, the wireless IC tag main body, made of a brittle material, becomes resistant to stress. The wireless IC is therefore protected from damage during vulcanization.

The unvulcanized rubber is denatured by the vulcanization for improved elasticity and durability, to have identical properties to the tire 1. The use of the unvulcanized rubber having identical properties, even if the IC tag main body 40 is secured to the tire 1 in harsh operating environment, enables reliable protection of the IC tag main body 40 from damage when the tire 1 is in use.

If, for example, an elastomeric, or other elastic material is used in place of the unvulcanized rubber, the IC tag main body 40 receives an external force due to the repulsive force generated by elastic deformation. The IC tag main body 40 is not sufficiently protected.

In each of the embodiments, the protective sheet 51, the protective layer 52, or the sheet material 61 completely covers one of the sides of the IC tag main body 40 so that no gaps or voids are left, before vulcanization. However, the protective sheet 51, the protective layer 52, or the sheet material 61 may leave some gaps (for example, holes or openings smaller than the thickness of the protective sheet 51, the protective layer 52, or the sheet material 61).

In a case like this, the gaps in the protective sheet 51, the protective layer 52, or the sheet material 61 are closed by deformation of the unvulcanized rubber near the gaps in vulcanization. Accordingly, the IC tag main body 40 is being prevented from damage during the vulcanization.

In addition, as shown in the perspective view of FIG. 10, by manufacturing an automobile 100 to which the aforementioned IC tag-carrying tires 1 are attached, the tires of the automobile 100 can be easily managed using the tire-mounted IC tags 20 (20a, 20b, 20c).

The IC tag carrying article of the present invention is an equivalent to the IC tag-carrying tire 1 of the embodiments in the relationship between the features of the present invention and the embodiments. In the following, the article is similarly an equivalent to the tire 10. The unvulcanized rubber used for the article is an equivalent to the inner liner 14. The wireless IC tag is an equivalent to either the tire-mounted IC tag 20a, 20c or the IC tag main body 40. The transmission means is an equivalent to the coil 42. The unvulcanized rubber on the IC tag is an equivalent to the protective sheet 51 and the sheet material 61. The vehicle is an equivalent to the automobile 100. The vulcanization is an equivalent to vulcanization step D. The unvulcanized rubber is an equivalent to a rubber member, such as an unvulcanized SBR (styrene-butadiene rubber), an NBR (acrylonitrile-butadiene rubber), an ethylene propylene rubber, a silicon rubber, butadiene, or polyisoprene (natural rubber). The memory means is an equivalent to the memory section.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

As described in the foregoing, the wireless IC tag securing method, wireless IC tag carrying article, and vehicle of the present invention are not damaged even if attached to an article in harsh operating environment. During manufacture, sale, use, and disposal of the article, the unique information of the individual article is obtainable from the wireless IC tag mounted to the article. The invention is therefore applicable to general flexible, deformable articles which needs to store unique information. Specific applications include various rubber products, such as the tires of automobiles, aircraft, and bicycles, as well as shoe soles, volley balls and other balls, rubber members for vibration absorption, and rubber sheets.

The invention claimed is:

1. A method of securing a wireless IC tag, comprising the steps of:
    directly covering an entire first surface of a wireless IC tag with a rubber member consisting of an unvulcanized rubber having identical properties to an unvulcanized rubber constituting an article to which the wireless IC tag will be secured, the wireless IC tag including memory means for storing data and wireless transmission means for wirelessly transmitting data;
    mounting a second surface of the wireless IC tag which is opposite the first surface to the article before vulcanization; and
    vulcanizing the article and the wireless IC tag to secure the wireless IC tag to the article,
    wherein the rubber member covering the wireless IC tag has such a size that the rubber member cannot be secured directly to the article around the wireless IC tag before the vulcanization, but can be secured directly to the article around the wireless IC tag after the rubber member undergoes plastic deformation and thus expands in the vulcanization.

2. The method of claim 1, wherein the wireless IC tag is secured to the article at a place other than a joint of the unvulcanized rubber constituting the article.

3. The method of either one of claims 1 and 2, wherein the unvulcanized rubber covering the entire first surface of the wireless IC tag is softer than the unvulcanized rubber constituting the article to which the wireless IC tag is secured.

4. A wireless IC tag carrying article, in which:
    an entire first surface of a wireless IC tag is directly covered with a rubber member consisting of an unvulcanized rubber having identical properties to an unvulcanized rubber constituting an article to which the wireless IC tag will be secured, the wireless IC tag including memory means for storing data and wireless transmission means for wirelessly transmitting data;
    a second surface of the wireless IC tag which is opposite the first surface is mounted to the article before vulcanization; and
    the article and the wireless IC tag are vulcanized to secure the wireless IC tag to the article,
    wherein the rubber member covering the wireless IC tag has such a size that the rubber cannot be secured directly to the article around the wireless IC tag before the vulcanization, but can be secured directly to the article around the wireless IC tag after the rubber member undergoes plastic deformation and thus expands in the vulcanization.

5. The wireless IC tag carrying article of claim 4, wherein the wireless IC tag is secured to the article at a place other than a joint of the unvulcanized rubber constituting the article.

6. The wireless IC tag carrying article of claim 4, wherein the unvulcanized rubber covering the entire first surface of the wireless IC tag is softer than the unvulcanized rubber constituting the article to which the wireless IC tag is secured.

7. A vehicle, comprising a rubber tire, in which:
an entire first surface of a wireless IC tag is directly covered with a rubber member consisting of an unvulcanized rubber having identical properties to an unvulcanized rubber constituting the tire to which the wireless IC tag will be secured, the wireless IC tag including memory means for storing data and wireless transmission means for wirelessly transmitting data;
a second surface of the wireless IC tag which is opposite the first surface is mounted to the tire before vulcanization; and
the tire and the wireless IC tag are vulcanized to secure the wireless IC tag to the tire,
wherein the rubber member covering the wireless IC tag has such a size that the rubber member cannot be secured directly to the tire around the wireless IC tag before the vulcanization, but can be secured directly to the tire around the wireless IC tag after the rubber undergoes plastic deformation and thus expands in the vulcanization.

8. The vehicle of claim 7, wherein the wireless IC tag is secured to the tire at a place other than a joint of the unvulcanized rubber constituting the tire.

9. The vehicle of claim 7, wherein the unvulcanized rubber covering the entire first surface of the wireless IC tag is softer than the unvulcanized rubber constituting the tire to which the wireless IC tag is secured.

10. The vehicle of claim 8, wherein the unvulcanized rubber covering the entire first surface of the wireless IC tag is softer than the unvulcanized rubber constituting the tire to which the wireless IC tag is secured.

11. The wireless IC tag carrying article of claim 5, wherein the unvulcanized rubber covering the entire first surface of the wireless IC tag is softer than the unvulcanized rubber constituting the tire to which the wireless IC tag is secured.

12. The method of claim 1, wherein the rubber member is secured directly to the article around the wireless IC by fusing along a periphery of the wireless IC tag.

13. The wireless IC tag carrying article of claim 4, wherein the rubber member is secured directly to the article around the wireless IC by fusing along a periphery of the wireless IC tag.

14. The vehicle of claim 7, wherein the rubber member is secured directly to the tire around the wireless IC by fusing along a periphery of the wireless IC tag.

* * * * *